United States Patent
Cupler, II

[15] 3,696,504
[45] Oct. 10, 1972

[54] METHOD OF PERFORMING SEQUENTIAL NON-MECHANICAL AND MECHANICAL MACHINING OPERATIONS ALONG A COMMON CENTERLINE

[72] Inventor: John A. Cupler, II, 10 Cupler Drive, LaVale, Cumberland, Allegany County, Md. 21502

[22] Filed: Aug. 11, 1971

[21] Appl. No.: 171,004

Related U.S. Application Data

[63] Continuation of Ser. No. 800,237, Feb. 18, 1969, abandoned, which is a continuation-in-part of Ser. No. 715,711, March 25, 1968, Pat. No. 3,478,419.

[52] U.S. Cl. ........... 29/558, 219/121 EB, 219/121 L, 264/25, 264/156, 408/1, 408/701, 408/704, 408/705
[51] Int. Cl. ............................................. B23p 13/04
[58] Field of Search....29/558, 557; 219/121 EB, 121 L; 331/94.5; 77/22, 25, 5; 460/1, 24, 701, 704, 705; 264/156, 25

[56] References Cited

UNITED STATES PATENTS

| | | | |
|---|---|---|---|
| 1,703,232 | 2/1929 | Gray et al. | 148/12.1 |
| 2,844,706 | 7/1958 | Lorenz | 219/69 |
| 3,265,855 | 8/1966 | Norton | 219/121 |
| 3,388,314 | 6/1968 | Gould | 219/68 X |
| 3,431,389 | 3/1969 | Tudor et al. | 219/121 |
| 3,440,388 | 4/1969 | Otstot et al. | 219/69 |

OTHER PUBLICATIONS

Gas-Jet Lasar Cutting – British Welding Journal, Aug. 8, 1967, pages 443– 445.

Primary Examiner—John F. Campbell
Assistant Examiner—Victor A. DiPalma
Attorney—Colton & Stone

[57] ABSTRACT

The disclosure relates to a method of drilling holes in difficulty machinable material wherein non-mechanical means, such as a laser or an electron beam, is used to drill a first undersize hole which is characterized by a surrounding recast area followed by a mechanical reaming operation to remove the recast area and produce a finished bore in the material which then reveals no metallurgical alteration.

12 Claims, 6 Drawing Figures

PATENTED OCT 10 1972
3,696,504
FIG. 1
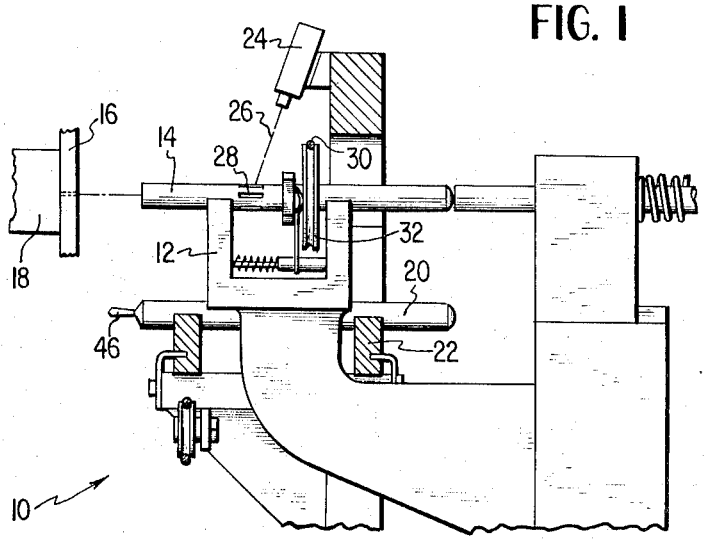
FIG. 3
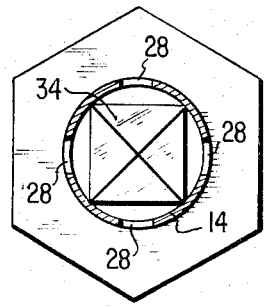
FIG. 2
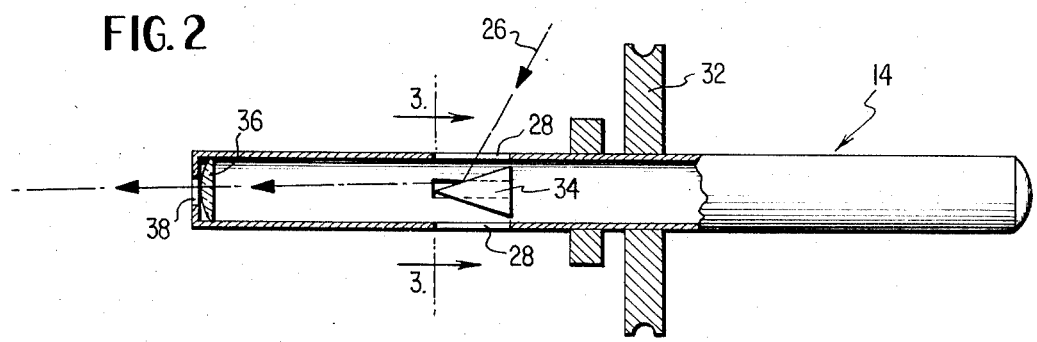
FIG. 4
FIG. 5
FIG. 6
INVENTOR
JOHN A. CUPLER, II
BY Colton + Stone
ATTORNEYS.
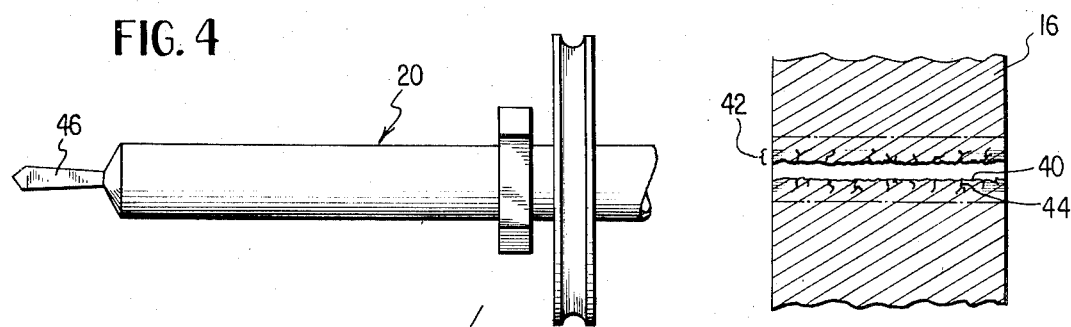

METHOD OF PERFORMING SEQUENTIAL NON-MECHANICAL AND MECHANICAL MACHINING OPERATIONS ALONG A COMMON CENTERLINE

This application is a continuation of Ser. No. 800,237, filed Feb. 18, 1969, now abandoned, which in turn was a continuation-in-part of, Ser. No. 715,711, filed Mar. 25, 1968, now U.S. Pat. No. 3,478,419.

The invention relates to methods of conducting machining operations and, more particularly, to methods of forming or "drilling" very small precision holes in difficulty machinable materials. Heretofore, it has been extremely difficult, and in many instances impossible, to mechanically drill very small precision holes in certain of the new space age alloys because of their extreme hardness and/or toughness coupled with the very small diameter drill such as, for example, in the range below 0.015 inch which would be required to drill such holes. The known problems attendant such drilling operations as regards shortened drill life generally as well as drill fatigue, drill breakage and drill dulling specifically are more fully pointed out in applicant's copending application, Ser. No. 786,344 entitled "Method of Machining Involving Progressive Step Tool Change" filed Oct. 23, 1968 now U.S. Pat. No. 3,570,330.

It has been previously proposed to utilize recently developed beam machining techniques employing lasers or electron beams to perform various machining operations on difficultly machinable materials. One such proposed useage is the machining of very small holes in hollow gas turbine blades for air cooling purposes. Due to the extreme environmental conditions under which turbine blades operate, particularly as regards centrifugal forces and high temperatures, the necessity for structural integrity of these blades is absolute. Even though turbine blades are normally cast from the most advanced alloys, the application of intense heat such as that generated by lasers and electron beams will produce a metallurgical alteration of the metal immediately adjacent the beam machined area. Such alteration is normally referred to as recast metal and is that whose metallurgical properties have been rendered inferior by the application of heat. Additionally, such metallurgical alterations are normally accompanied by hairline cracks in the recast portion of the metal. These minute hairline cracks would not be critical in many instances but in those structures where the requirement for structural integrity is absolute, such as in turbine blades, they are considered to be fatal. The reason for this is that under the extreme operating conditions experienced in gas turbine engines the hairline cracks represent the weak points of the blade and they frequently enlarge and extend until the blade fails. The failure of a single turbine blade will virtually destroy the rotor section of an engine in which the failure occurs resulting in engine shut-down as well as time consuming and expensive repairs. In the case of a single engine aircraft, the failure of a single turbine blade could, of course, result in loss of the aircraft.

A primary object of the invention is to teach a method of machining wherein the advantages of beam machining techniques may be employed in a manner such that the finished product is not metallurgically changed.

It is among the further objects of the invention to teach a method of drilling difficultly machinable materials utilizing a combination of beam and mechanical techniques that is far faster than previous mechanical drilling techniques and, yet, retains the advantages of mechanical drilling as regards bore wall smoothness and lack of metallurgical changes in the metal being machined; and to insure that the mechanical and non-mechanical drilling operations are performed coaxially.

These and other objects of the invention are achieved by the beam drilling of a hole which is undersize in diameter as compared to the desired finished hole and then mechanically reaming the beam drilled hole to the desired diameter while, concomitantly, removing the metallurgically changed material immediately surrounding the beam drilled hole.

It is, of course, essential that the undersize beam drilled hole and the mechanical reaming tool be coaxial. In order to insure this coaxial relationship as well as to provide the relatively fast interchange of beam and mechanical drilling equipment that is essential from the standpoint of operating economy; the automatic tool changer described in the aforesaid copending application, Ser. No. 715,711 is advantageously utilized in the practice of the invention.

Concentricity of the beam drilled hole with the initial axis of rotation of the mechanical drilling tool is insured by virtue of rotating the beam focussing equipment during the beam drilling operation.

The manner in which the foregoing and other objects are achieved will become more apparent from the ensuing description when considered in conjunction with the drawings, wherein:

FIG. 1 depicts, fragmentarily, an elevational view of an automatic tool changer wherein a non-mechanical or beam drill is illustrated in working position and a mechanical drill is shown in non working position relative to a workpiece depicted in broken elevation;

FIG. 2 is a greatly enlarged showing of the non-mechanical or beam drill shown in FIG. 1;

FIG. 3 is a cross-sectional view taken along line 3—3 of FIG. 2;

FIG. 4 is a greatly enlarged showing of the mechanical drill shown in FIG. 1;

FIG. 5 is a greatly enlarged fragmentary illustration of the workpiece shown in FIG. 1; and FIG. 6 is a view similar to FIG. 2 illustrating the manner in which rotation of the beam drill assures concentricity of the bore.

A non-mechanical tool or drill is herein defined as one which directs a source of energy toward a workpiece to perform a machining or drilling operation as opposed to the physical engagement of the tool, itself, with the workpiece as in the case of a mechanical tool or drill.

In FIG. 1 is fragmentarily illustrated an automatic tool changer 10 of the type fully described in copending application, Ser. No. 715,711 filed Mar. 25, 1968. Vee bearing 12 supports a non-mechanical tool or drill 14 in position to machine workpiece 16 supported by a conventional workholder 18. A mechanical drill 20 is shown in non-working position on tool rack 22 which is capable of interchanging tools 14 and 20 on Vee bearing 12 in the manner fully described in the aforesaid copending application.

Although the non-mechanical drill may assume many forms such as electrodischarge machining, ultrasonic or grit blasting equipment; the invention is primarily directed to the use of beam drilling equipment which includes lasers and electron beams. While the invention is specifically described with reference to a laser source and optical focussing equipment, it will be apparent that the conventional electron beam source and electromagnetic focussing equipment may be substituted therefor.

A laser source 21 directs defocussed beam 26 through elongated openings 28 in the hollow cylindrical non-mechanical tool 14 while the same is undergoing rotation by virtue of the engagement of drive belt 30 with drive pulley 32 affixed to tool 14. As tool 14 is rotated, beam 26 passes, sequentially, through the four openings 28 to impinge on one of the four faces of pyramidal mirror 34 and be reflected to focussing lens 36 from whence the same passes through tool aperture 38 to workpiece 16. The workpiece is illustrated, in FIGS. 1 and 5, as having already been "drilled" by the focussed laser beam to produce rough walled bore 40 and the immediately surrounding recast area 42 containing hairline cracks 44 which recast area and cracks are characteristics of beam machining as has been previously explained.

Bore 40 is drilled undersize by the focussed laser beam and thereafter reamed by mechanical tool 20 whose blade 46 removes recast area 42 to produce a smooth walled bore of desired finished diameter indicated by the phantom lines in FIGS. 1 and 5.

The fact that beam drilling tool 14 is rotated results in beam 26 being pulsed as the unfocused portion of the beam is broken by the solid portions of tool 14 intermediate the apertures 28. The pulsing of the beam does not adversely affect its machining characteristics and the rotation of the tool insures that the beam drilled hole will always be coaxial with the axis of tool rotation. This concept is illustrated in FIG. 6 wherein it may be seem that even through beam 26 may not be coincident with tool axis 48 the circular sweep of the beam, indicated by dotted line 50, will insure that the bore thus drilled is coaxial with axis 48.

Depending on whether the depth of bore 40 requires axial movement of tool 14, the same may be preprogrammed for axial infeed or not, independently of the necessary infeed of mechanical tool 20, in the manner explained in the aforesaid copending application. Apertures 28 and mirror 34 are of such axial length as to insure that beam 26 may impinge on the mirror throughout the extent of reciprocating movement that may be imparted to tool 14.

I claim:

1. A method of forming a finished diameter bore in a metallic workpiece, comprising; simultaneously forming an undersize bore in said workpiece and producing a metallurgically altered zone surrounding said undersize bore by beam machining said workpiece; and then concomitantly enlarging said undersize bore and removing said zone throughout the entire length thereof by a rotary metal removal operation to produce said finished diameter bore.

2. The method of claim 1 wherein said beam machining consists of laser machining.

3. The method of claim 1 wherein said beam machining consists of electron beam machining.

4. A method of machining a workpiece, comprising; positioning a beam machining tool on a fixed tool support adjacent a metallic workpiece; beam machining said workpiece along a centerline to simultaneously form an undersize bore and a metallurgically altered zone surrounding said undersize bore; substituting a rotary metal removal tool on said fixed tool support for said beam machining tool; and mechanically machining said workpiece along said centerline to concomitantly enlarge said undersize bore and remove said zone throughout the entire length thereof by said rotary metal removal tool to produce a finished bore.

5. The method of claim 4 including the step of directing a source of beam energy to said beam machining tool; and directing and focussing said beam from said beam machining tool to said workpiece.

6. The method of claim 5 including the step of imparting rotation to said tools during the machining operations.

7. A method of forming a finished diameter bore in a difficulty machinable workpiece, comprising; simultaneously forming an undersize bore in said workpiece and producing a physically altered zone surrounding said undersize bore by beam machining said workpiece; and then concomitantly enlarging said undersize bore and removing said zone throughout the entire length thereof by a rotary workpiece removal operation to produce said finished diameter bore.

8. The method of claim 7 wherein said beam machining consists of laser machining.

9. The method of claim 7 wherein said beam machining consists of electron beam machining.

10. A method of machining a difficulty machinable workpiece, comprising; positioning a beam machining tool on a fixed tool support adjacent said workpiece; beam machining said workpiece along a centerline to simultaneously form an undersize bore and a physically altered zone surrounding said undersize bore; substituting a rotary workpiece removal tool on said fixed tool support for said beam machining tool; and mechanically machining said workpiece along said centerline to concomitantly enlarge said undersize bore and remove said zone zone throughout the entire length thereof by said rotary workpiece removal tool to produce a finished bore.

11. The method of claim 10 including the step of directing a source of beam energy to said beam machining tool; and directing and focussing said beam from said beam machining tool to said workpiece.

12. The method of claim 11 including the step of imparting rotation to said tools during the machining operations.

* * * * *